Figure 1:
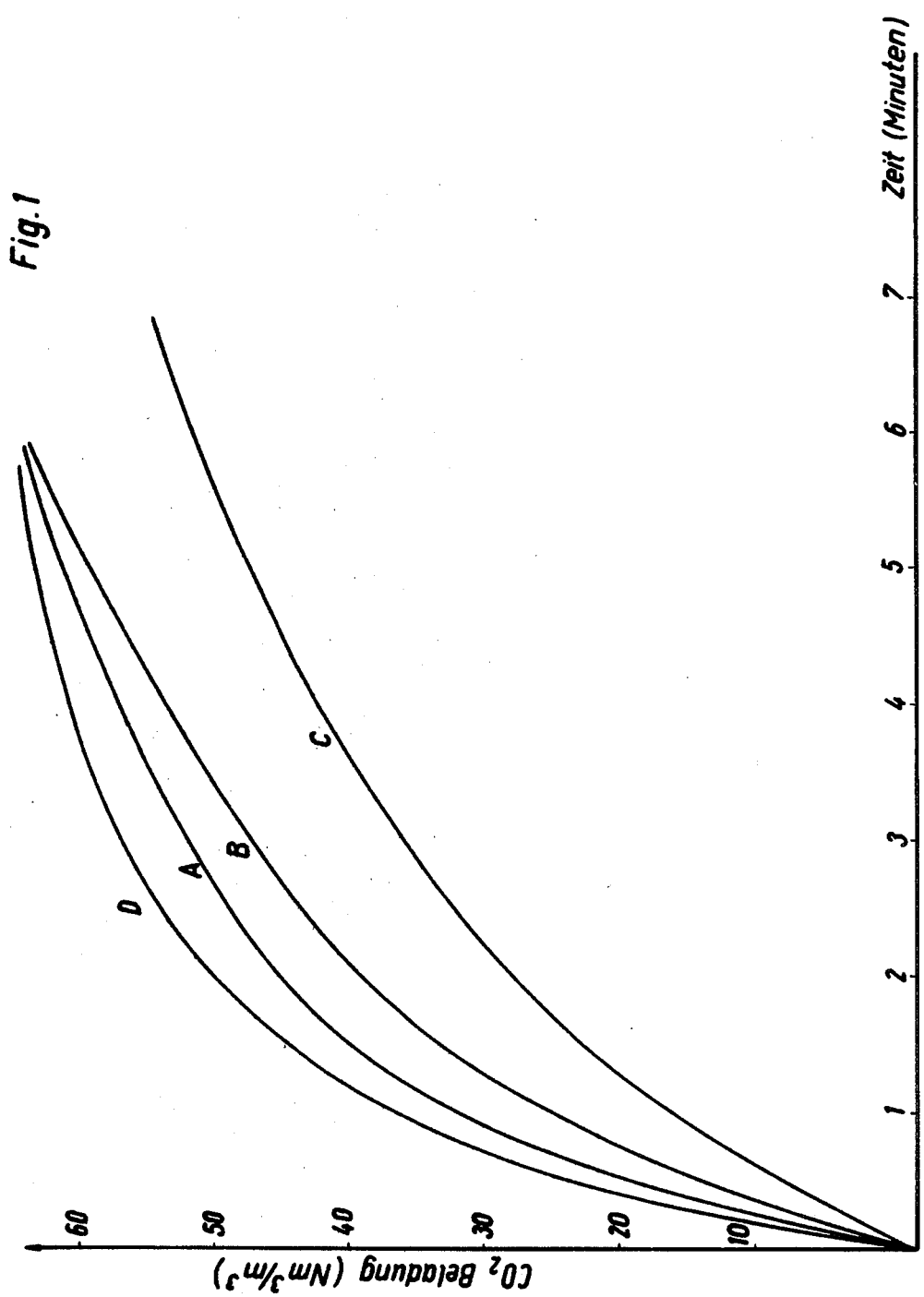

United States Patent [19]

Braizler et al.

[11] 4,137,294
[45] * Jan. 30, 1979

[54] PROCESS OF SCRUBBING FUEL SYNTHESIS GASES TO REMOVE ACID GASES AND ORGANIC SULFUR COMPOUNDS

[75] Inventors: Karl Braizler, Bad Homburg von der Hohe; Alexander Doerges, Oberursel, both of Germany

[73] Assignee: Metallgesellschaft Aktiengesellschaft, Frankfurt am Main, Germany

[*] Notice: The portion of the term of this patent subsequent to Jun. 30, 1993, has been disclaimed.

[21] Appl. No.: 674,992

[22] Filed: Apr. 8, 1976

Related U.S. Application Data

[63] Continuation of Ser. No. 881,390, Dec. 2, 1969, abandoned.

[30] Foreign Application Priority Data

Dec. 17, 1968 [DE] Fed. Rep. of Germany ....... 1815137

[51] Int. Cl.² .............................................. B01D 53/34
[52] U.S. Cl. .................................... 423/223; 423/226; 423/228; 55/68; 55/73
[58] Field of Search ............... 423/226, 227, 228, 229, 423/223, 220; 55/68, 73

[56] References Cited

U.S. PATENT DOCUMENTS

| | | | |
|---|---|---|---|
| 1,964,808 | 7/1934 | Bottoms | 423/223 |
| 2,031,632 | 2/1936 | Bottoms | 423/223 |
| 2,163,169 | 6/1939 | Gollmar | 423/227 |
| 2,445,468 | 7/1948 | Blohm et al. | 423/226 |
| 2,524,088 | 10/1950 | Shaw | 423/227 |
| 2,863,527 | 12/1958 | Herbert et al. | 55/68 |
| 3,653,810 | 4/1972 | Bratzlet et al. | 423/229 |

FOREIGN PATENT DOCUMENTS

461001 2/1937 United Kingdom ..................... 423/226

Primary Examiner—Earl C. Thomas
Attorney, Agent, or Firm—Dinklage & Sprung Burgess

[57] ABSTRACT

In scrubbing fuel gases or synthesis gas, absorption is improved by using simple oxygen containing water soluble organic compounds such as the lower alcohols, butanols, or water soluble lower ethers.

5 Claims, 3 Drawing Figures

PROCESS OF SCRUBBING FUEL SYNTHESIS GASES TO REMOVE ACID GASES AND ORGANIC SULFUR COMPOUNDS

This is a continuation of application Ser. No. 881,390, filed Dec. 2, 1969, and now abandoned.

This invention relates to a process of scrubbing fuel gases and synthesis gases to remove acid gases, particularly hydrogen sulfide and carbon dioxide, and organic sulfur compounds.

Such gases are, e.g., natural gases consisting mainly of methane and containing small amounts of other hydrocarbons and also containing $CO_2$ and/or $H_2S$ in varying amounts, depending on the origin of the gas. Gases having a high carbon dioxide content are also formed by the gasification of solid or liquid fuels by the catalytic cracking of liquid hydrocarbons by means of steam and, if desired, oxygen.

In order to prevent a poisoning of the catalysts, sulfur is removed from the hydrocarbons used as feed material in catalytic cracking processes so that the gas produced by these processes is free of sulfur and contaminated virtually only with carbon dioxide. Where solid and liquid fuels are used as feed material, the sulfur content must also be taken into account so that sulfur-containing gases must be expected.

It is known to scrub gases with alkaline solutions of alkali salts of weak inorganic or organic acids or with liquid organic bases to remove carbon dioxide and hydrogen sulfide. The absorbed carbon dioxide can be released from the laden neutralized solutions by heating the latter and bubbling steam or air through them. This will regenerate the solution so that it can be cooled and re-used as an absorbent.

The processes are described as chemical scrubbing processes or neutralizing scrubbing processes in which the absorption capacity of the scrubbing solution is substantially determined by the stoichiometric law and is almost independent of the total pressure of the gas. These processes are preferably fine scrubbing processes employed to remove carbon dioxide present in medium and small concentrations to high degrees of purity, or to purify gases which are uncompressed or only slightly compressed.

So-called physical scrubbing processes are used to advantage when it is desired to remove acid components by scrubbing from gases which are compressed, e.g., to an absolute pressure of 10 kilograms per square centimeter and which have a comparatively high content of acid components. In these physical scrubbing processes, the gas components to be removed are dissolved rather than chemically combined. The solubility of the gases and the absorption capacity of the absorbent increase as the pressure increases and the temperature decreases. The physical absorbents are preferably regenerated by flashing to ambient pressure or a still lower pressure, in combination with the application of heat, if desired.

In a known process, which is preferably used to purify gases at high rates of about 1 million standard cubic meters or more per day, synthesis gases produced by a gasification of solid or liquid fuels with oxygen and steam are scrubbed at temperatures down to about $-50°$ C. and under pressures in excess of an absolute pressure of about 10 kilograms per square centimeter to jointly remove all gas components except for the permanent gases CO, $H_2$, $CH_4$. The gases which are thus removed include particularly hydrogen sulfide and organic sulfur compounds, carbon dioxide and unsaturated hydrocarbons. Suitable absorbents are methanol, ethanol, acetone, toluene, xylene, heptane and others. In such process, the absorbent will absorb a much higher total of acid gases than can be absorbed in the chemical scrubbing processes, where the scrubbing solution can absorb 25–30 standard cubic meters $CO_2$ + $H_2S$ per cubic meter. For this reason the scrubbing agent recirculation rate is often lower in physical scrubbing processes than in chemical scrubbing processes.

In view of the above, it has been suggested to combine the advantages of a physical scrubbing process with those of a chemical scrubbing process in that a component for chemically combining with the acid gases, e.g., an amine, is added to the physically dissolving absorbent. Diethylene glycol, which is a high-boiling solvent, has been used, e.g., as a physical solvent. Such mixture may also contain water and must be heated to temperatures about 100° C., to 120–140° C., to remove $H_2S$ and $CO_2$. This will require steam under a superatmospheric pressure of at least 2 kilograms per square centimeter and in most cases of 4–6 kilograms per square centimeter and such steam is at a temperature of and above 160° C. This relatively high temperature results in an initial decomposition of the main solvent, such as glycol, so that corrosive decomposition products are formed in the scrubbing agent and are enriched therein. Because diethylene glycol has a high boiling point (244.5° C.), it is inconvenient and time-consuming to process such contaminated scrubbing solutions by distillation.

The object of this invention is to avoid the aforesaid disadvantages in the use of absorbents.

In general, this object is obtained by the finding that absorbents containing simple oxygen-containing, water-soluble organic compounds, particularly the lower alcohols methanol, ethanol, propanol, isopropanol, and the butanols which are miscible with water, or the water-soluble lower ethers, as well as 0.2–4 moles per liter of one or more organic bases, particularly simple alkanolamines, are particularly effective. They distinguish by the rapid absorption of acid gas components and can easily be regenerated to very low residual concentrations of acid gas components. The low-boiling physical solvent components of this mixture afford the advantage that the absorbent solution can be regenerated by heating to temperatures up to about 100° C. so that inexpensive exhaust steam can be used for this purpose and there is no risk of a thermal decomposition of absorbent components.

Particles of the absorbent which have been entrained by the pure gas and the waste gas of the regeneration may be removed from these gases by scrubbing with a high-boiling organic solvent and may be recovered by distillation from said solvent. Solvents which may be used for this purpose include, e.g., diethylene glycol or triethylene glycol.

If the purified gas need not be dry, the absorbent vapors may be removed from the pure gas and from the laden regenerating gas by scrubbing said gases with water.

The amount of 0.2–4 moles per liter in which the base is added to the physical solvent is critical because a base added in an amount outside this range will reduce the absorption rate.

Figure 2:
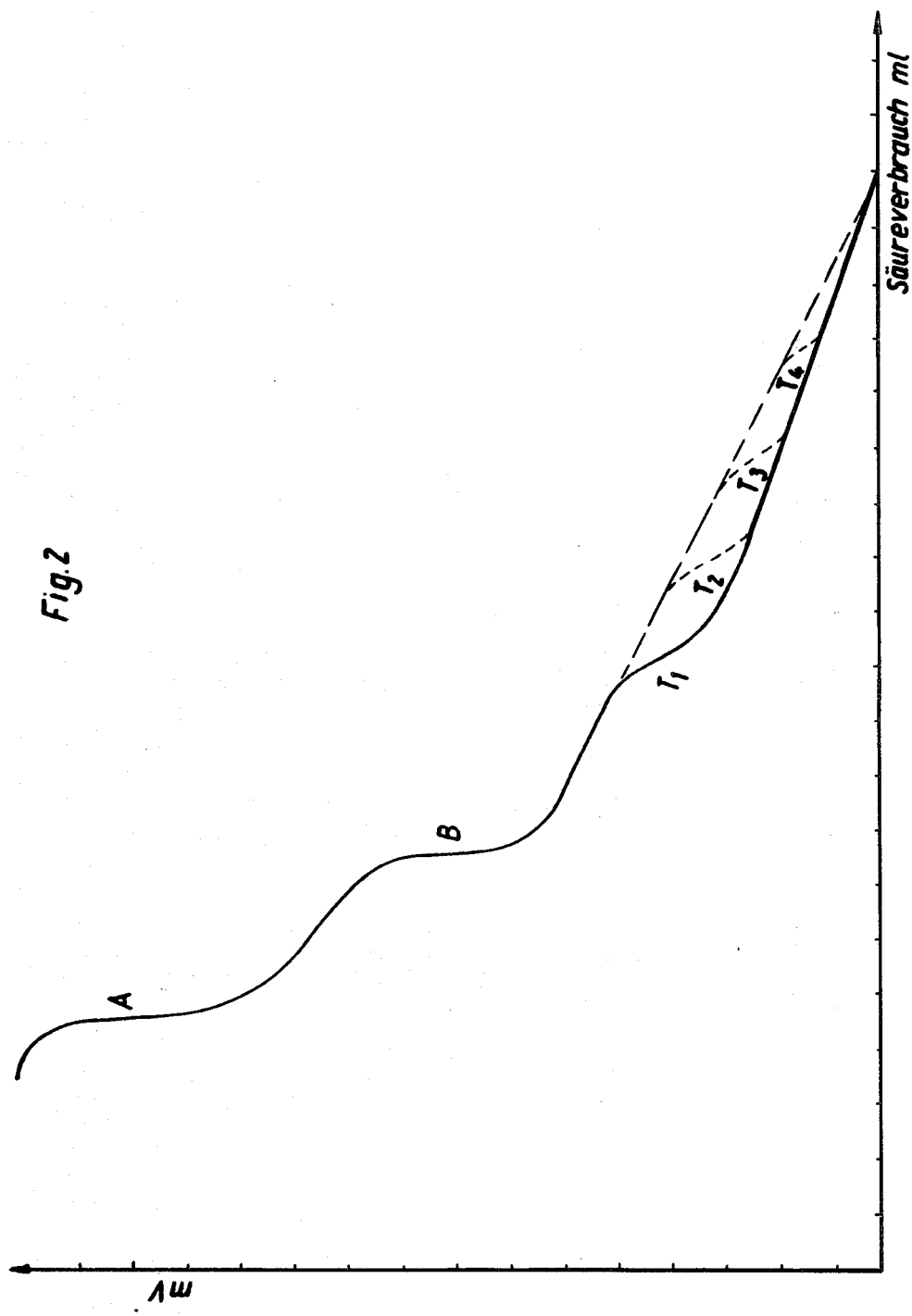
Figure 3:
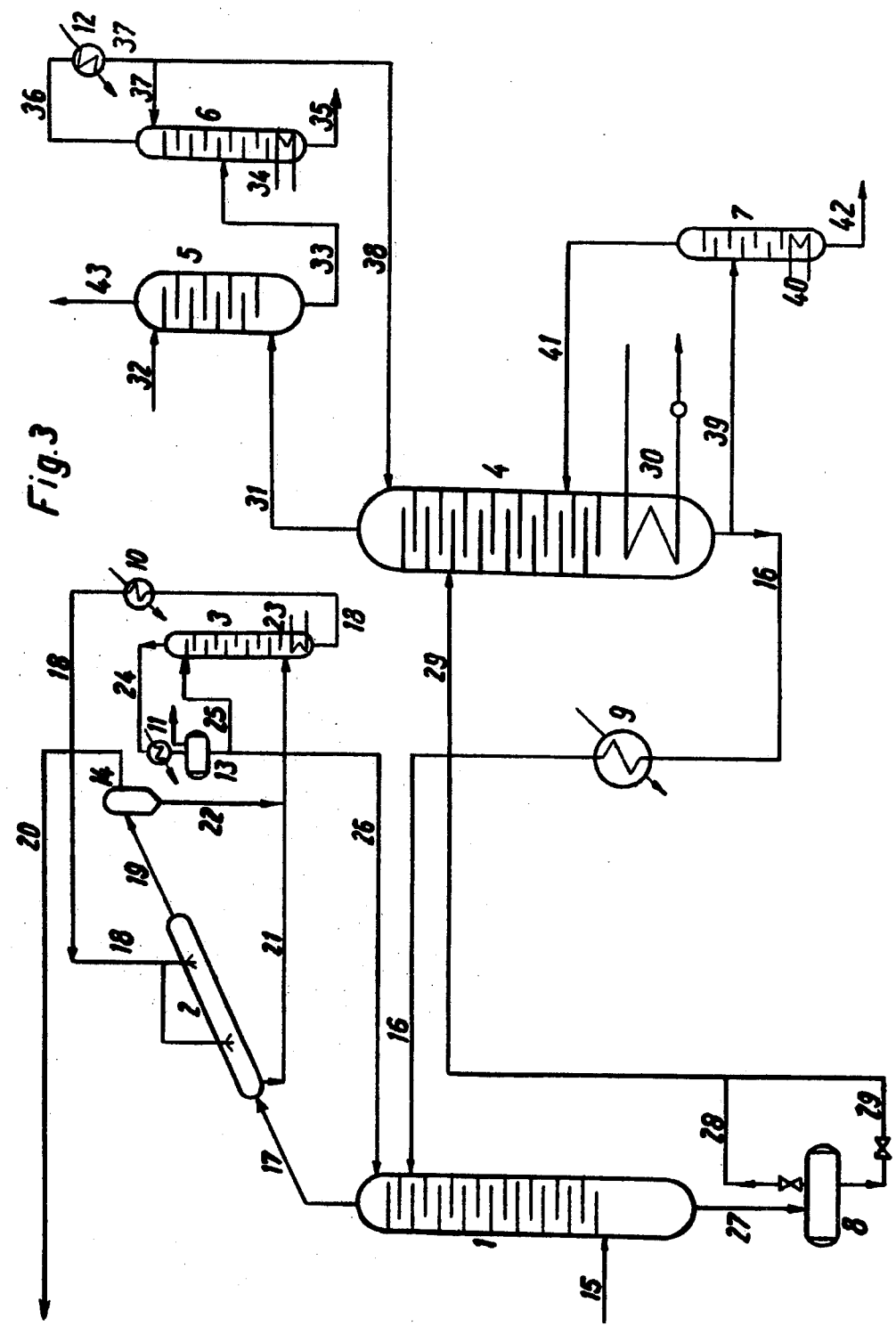

The means by which the objects of this invention are obtained are described more fully with reference to the accompanying drawings, in which:

FIG. 1 is a graph of curves of absorption times;
FIG. 2 is a graph of titration curves; and
FIG. 3 is a flow scheme chart of a plant using the process of this invention.

In FIG. 1, the time in minutes is plotted along the horizontal axis and the amount of absorbate in an absorbent solution in standard cubic meters of $CO_2$ per cubic meter of the solution is plotted along the vertical axis.

Curve C is applicable to a solution of 5 moles monoethanolamine per liter in methanol containing 10% by weight of water.

Curve B is applicable to a solution of 3 moles of monoethanolamine per liter in methanol containing 10% by weight of water.

It is apparent from these two curves that the addition of a base in a large amount does not result in a high absorption rate.

Curve D is applicable to a solution of 3 moles monoethanolamine per liter in anhydrous methanol. It is apparent that the highest absorption rate is obtained in the absence of water.

When the absorbent contains water, the absorption of methane is diminished while on the other hand hydrolysis of COS is facilitated. By this hydrolysis COS is converted to $CO_2$ and $H_2S$ which are easily absorbed by the absorbent according to this invention.

It has surprisingly been found that the absorption rate of the solution to which curve B is related increases after an initial operating time of a few days, when the solution has been repeatedly regenerated, and the absorption rate is then constantly in accordance with curve A. This result is not highly significant and has not yet been fully explained. It has only been proved to be reproducible and has been discovered in experiments in which slightly acid corrosion inhibitors, such as $V_2O_5$, were replaced by other weak acids, particularly organic acids.

It has been found in these experiments that the solution of 3 moles monoethanolamine per liter in methanol containing 10% by weight of water has an absorption rate in accordance with curve A from the beginning if the solution contains additionally 0.01-0.2 moles/liter of an acid having a $p_K$ value of 7-11. The $p_K$ value is defined as the negative logarithm of the dissociation constant of the acid or, with polybasic acids, the dissociation constant of the acid after the first dissociation step, in an aqueous solution at 25° C. Such additions may improve the regeneratability of an absorbent solution because they are difficultly volatile acids which promote the removal of the last residual amounts of the volatile acid components.

Acids having a $p_K$ value in excess of 12 are not sufficiently effective for a complete regeneration of the solution.

Acids having a $p_K$ value below 7 render the absorption of acid gases more difficult.

In comparison, tests using solutions which contain different weak acids in different concentrations, as well as an acid-free standard solution, the latter exhibited a continuous improvement in absorption rate from initial values corresponding to curve B to values in accordance with curve A within a few days.

This effect is apparent from the titration curves shown in FIG. 2 and representing the potentiometric titration of regenerated acid-free absorbent which contains 3 moles monoethanolamine per liter of a methanol-water mixture having 10% per weight of water. In the diagram the consumption of acid in milliliter is plotted along the horizontal axis and voltage of the concentration chain in millivolt is plotted along the vertical axis. The titration was carried out between a glass electrode and a calomel electrode.

The absorbent was regenerated to a predetermined degree. Four samples of regenerated absorbent were taken at intervals of two hours. The titration was carried out with n/10 hydrochloric acid.

In the range of higher consumption of acid the resulting titration curves all of samples show the jumps in potential A and B, indicating the change of carbonate to bicarbonate and the change of bicarbonate to chloride. In this range, the titration curves were virtually coincident. As to be seen by the dotted parts, the four titration curves are different when consumption of acid increases from the start of the titration, that means for small contents of hydrochloric acid. The curve shows a jump in potential $T_1$ preceding the decomposition of carbonate soon after the operative use of the solution. Increasing time of use effects migration of the jump in potential towards the zero-point of the coordinates that is to decreasing consumption of acid. Finally, the curve indicates a linear ascension until the jump in potential A. The jumps $T_2$, $T_3$, $T_4$ signify this migration corresponding to the increase of operating time. These jumps in potential show that there must be another reaction set ahead to the absorption of $CO_2$, the reaction product thereof disappears by increasing operating time.

When the titration is repeated under the same conditions but after adding a weak acid to the fresh absorbent there are no jumps in potential $T_1$ to $T_4$ obtained and the dotted part in curve of titration shows to be identical with the cruve which is drawn out, just from the beginning.

The water content of the absorbent is of special significance in the scrubbing of hydrocarbon-containing gases, particularly natural gas, to remove acid gases. It has been found that even under a high (absolute) pressure of 53.8 kilograms per square centimeter the solvent containing 10% water will dissolve at 30° C. only 0.10 standard cubic meter methane per cubic meter whereas more than three times this amount will be dissolved by a solvent which contains no water. In the latter case, the losses of hydrocarbons are much reduced and the acid gases removed by scrubbing contain much less hydrocarbon impurities.

The water content of the solvent is also significant in scrubbing processes intended to remove hydrolyzable organic sulfur compounds such as carbon oxysulfide (COS) and carbon disulfide ($CS_2$). Particularly scrubbing agents which contain monoethanolamine can completely remove these compounds from the gas. Dissolved by-products, which cannot be removed by regeneration, may be formed and their formation is hindered by the presence of water. Any by-products which are nevertheless formed and which cannot be removed by regeneration may be removed in a simple manner by a distillation of the volatile constituents of the solvent.

Gases having a high content of hydrogen sulfide may be desirably scrubbed with methanol at temperatures of −10° C. to +30° C. to remove a major portion of hydrogen sulfide from the gas, which is subsequently scrubbed with recirculated methanol, which contains a base, to remove $CO_2$, residual $H_2S$ and organic sulfur compounds. The methanol which is entrained by the purified exhaust gas is suitably removed in that the gas is slightly scrubbed with sprayed polyalcohol, preferably diethylene glycol, which is regenerated by being heated and distilled off and which is recirculated. The methanol which has been recovered by regeneration is returned to the absorber so that other absorbent components are kept from the pure gas.

FIG. 3 is a flow scheme representing by way of example a plant for carrying out the process according to the invention. The plant comprises a scrubbing tower 1, which includes a backscrubber 2 and a distillation unit 3, also a regenerator 4 including a back-scrubbing section 5 and a distillation unit 6, a distillation unit 7, a flash tank 8, coolers 9, 10, 11, and 12, a container 13 and a trap 14.

The gas to be purified enters the scrubber 1 through conduit 15. An absorbent solution consisting of methanol containing 3 moles monoethanolamine per liter, and 10% by weight of water is supplied through conduit 16. $CO_2$, $H_2S$ and COS will be removed from the gas by the treatment with this solution. The purified gas leaves the scrubber through conduit 17 and still contains some methanol vapor, which is removed in the scrubbing pipe 2 (back-scrubber) by a treatment with diethylene glycol supplied through conduit 18. The purified gas, which is free of methanol, flows through conduit 19, trap 14 and conduit 20 to a place where it is used. Diethylene glycol which contains methanol and is discharged from the scrubbing pipe and the trap is conducted through conduits 21 and 22 to a distillation column 3, which is provided with a heater 23 and serves to remove the methanol. Methanol vapor is withdrawn through conduit 24 and condensed in cooler 11. The condensate is collected in the container 13. Part of the condensate is recirculated through conduit 25 to the distillation column 3 whereas the methanol which has been removed from the gas by back-scrubbing is returned to the top of the scrubber 1 through conduit 26. This practice avoids an ingress of volatile bases from the base-containing methanol into the outflowing gas together with the methanol so that the bases would be lost.

The scrubbing agent which is laden with $CO_2$, $H_2S$ and COS flows through conduit 27 into the flash tank 8, where part of the absorbed gases are flashed off and escape through the conduit 28. These gases together with the flashed scrubbing solution are introduced through conduit 29 into the regenerator 4, the sump 30 of which is heated to release the dissolved gases from the scrubbing solution. The regenerated scrubbing agent is cooled in the cooler 9 and is returned in conduit 16 to the top of the scrubber 1. The released gases are conducted by the conduit 31 into the back-washer 5, where they are scrubbed with water from conduit 32 to remove methanol. The conducted gases are then discharged through conduit 43 as exhaust gas or for further use.

The methanol-containing water which is supplied from the back-scrubber 5 is conducted through conduit 33 to the top of the distillation column 6, which is heated by the heater 34 to release methanol whereas water is discharged through conduit 35. Methanol vapor is conducted through conduit 36 to a condenser 12, from which condensate is partly recirculated through conduit 37 to the distillation column 6 and partly changed through conduit 38 to the top of the regenerating column 4.

The base-containing methanol which is recirculated between the scrubber 1 and the regenerator 4 should be kept free as far as possible from by-products which cannot be regenerated. To this end, a partial stream of the regenerated scrubbing agent may be supplied through conduit 39 to a stripper 7, which is heated by a heater 40 to evaporate the distillable components, which are supplied through the conduit 41 to the regenerator 4. The residue which cannot be distilled off is drained through conduit 42.

If acid gases are to be removed at a high rate, the heat of reaction developed in the absorber 1 may be so large that it is necessary to cool the scrubbing agent. This may be effected either in that the scrubbing agent is cooled to a correspondingly low temperature in the cooler 9 before it enters the absorber 1 or in that the scrubbing agent is intercooled as it is used for scrubbing in the absorber 1.

EXAMPLE

A natural gas for use in a long-distance town gas supply system consists, on a volume basis, of
73.14% $CH_4$
0.5% $C_2H_6$
0.4% $C_3H_8$
22.1% $CO_2$
4.2% $H_2S$
0.02% COS The gas was dry and at a temperature of 23° C. and under a (superatmospheric) pressure of 56 kilograms per square centimeter. The sulfur compounds were to be removed to less than 10 parts per million and the $CO_2$ to a maximum of 1% by volume. The plant used for this purpose was operated in accordance with the process of this invention as follows (FIG. 3):

At a rate of 50,000 standard cubic meters per hour, the gas to be scrubbed was fed through conduit 15 into the absorber 1. Scrubbing agent was supplied through conduit 16 and acted to remove 10,900 standard cubic meters $CO_2$ per hour, 2100 standard cubic meters $H_2S$ per hour, 9.8 standard cubic meters COS per hour and 920 standard cubic meters $CH_4$ per hour so that 36,071 standard cubic meters per hour of purified gas containing 0.39% by volume $CO_2$, 1.5 milligrams $H_2S$ per standard cubic meter and 5 parts per million COS was discharged from absorber 1 through conduit 17 at a temperature of 25° C. This gas had absorbed 162 kilograms methanol per hour, which was back-scrubbed in the back-scrubber 2 with diethylene glycol sprayed at a rate of 2 cubic meters per hour. The pure gas was discharged through conduit 19, trap 14 and conduit 20 under a (superatmospheric) pressure of 55 kilograms per square centimeter and a temperature of 24° C. and was dry and free of methanol and could be supplied into the long-distance gas supply system.

The scrubbing agent supplied to the scrubber 1 contained
3.0 moles diethanolamine per liter
10% by weight water
dissolved in methanol. At a rate of 255 cubic meters per hour, part of this solution was recirculated between the absorber 1 and the regenerator 4. 10,900 standard cubic meters $CO_2$ per hour, 2100 standard cubic meters $H_2S$ per hour, 920 standard cubic meters $CH_4$ per hour and 9.8 standard cubic meters COS per hour were absorbed from the gas in the absorber 1. The scrubbing agent entering the absorber 1 through conduit 16 had initially a temperature of 28° C. and by the absorption of $CO_2$ and $H_2S$ was heated to 74° C. At this temperature, the scrubbing agent which contained $CO_2$, $H_2S$ and COS entered the flash tank 8, where it was flashed to 3 kilograms per square centimeter above atmospheric pressure and was thus cooled to 53° C. The partly flashed scrubbing agent and the flashed-off $CO_2$ entered through conduit 29 into the regenerator 4, where it was flashed to the operating pressure of the regenerator amounting to about 1 kilogram per square centimeter (absolute pressure). In the sump of the regenerator, the scrubbing agent was indirectly heated to 80° C. so that it boiled and virtually all $CO_2$ and $H_2S$ was removed. The COS which had been absorbed in the absorber was virtually completely hydrolyzed to form $H_2S$ and $CO_2$ which were also removed. The regenerated scrubbing agent was supplied through conduit 16 and a cooler 9, cooled to 28° C. and returned to the scrubbing tower 1.

The vapors escaping through conduit 31 from the top of the regenerator 4 contained 10,909 standard cubic meters $CO_2$ per hour, 2,110 standard cubic meters $H_2S$ per hour and 920 standard cubic meters $CH_4$ per hour and also contained methanol. For this reason, 6 cubic meters water per hour were supplied through conduit 32 to the back-scrubber 5 and used to back-scrub the methanol. The methanol-free gas escaped through conduit 43. It contained 15% by volume $H_2S$ and could be processed into sulfur in a Claus plant. The water-containing methanol was distilled in column 6. Methanol was condensed in condenser 12 and was partly recirculated to the column 6 and partly supplied through conduit 38 to the top of the regenerator 4. This avoided an ingress of the organic gas in addition to methanol into the back-scrubber 5, where the base would be lost together with the effluent from column 6 through conduit 35.

The methanol which had been back-scrubbed from the gas in the back-scrubber 2 by recirculated diethylene glycol was similarly recovered in that the methanol-containing glycol drained through conduit 21 was heated in column 3 so that methanol was stripped off and liquefied in condenser 11. This recovered methanol was partly recirculated in column 3 and partly supplied through conduit 26 to the top of the absorber 1, so that an escape of organic base from the scrubbing agent was also prevented.

In the process which has been described by way of example, it is sufficient to heat the scrubbing agent in the regenerator 4 to 98° C. This may be accomplished by indirect heating with the aid of inexpensive exhaust steam under a (superatmospheric) pressure of 0.2 kilogram per square centimeter and at 104° C. so that there is no need for a recovery of heat with the aid of expensive heat exchangers.

A plant operated under the conditions with the absorbent described in the example needs about two days to reach the optimal results named above. When 0.03 Mol% of a weak acid as boric or vanadic acid is added to the absorbent as described in this example, these optimal results are reached a few hours after starting the plant.

Having now described the means by which the objects of this invention are obtained, we claim:

1. In a process for scrubbing fuel and synthesis gases to remove hydrogen sulfide, carbon dioxide and organic sulfur compounds therefrom wherein the gas to be treated to produce substantially pure gas is passed through an absorption zone at a superatmospheric pressure and at a temperature of above 0° C. up to 100° C. and then through a scrubbing zone to recover entrained absorbent, the absorption zone being supplied with a circulating absorbent comprising a primary aliphatic alcohol, one or more alkanolamines and eventually water, whereafter the absorbent is regenerated by flashing and heating, the improvement which comprises washing the gases in the absorption zone using an absorbent consisting essentially of methanol and 0.2 to 4 moles of an alkanolamine per liter of absorbent, flashing the rich absorbent and heating it to a boiling temperature not higher than 100° C., cooling the absorbent and recirculating it to the absorption zone.

2. Process of claim 1, wherein the alkanolamine is selected from the group consisting of monoethanolamine, diethanolamine and mixtures thereof.

3. Process of claim 1, wherein 0.01 to 0.2 moles per liter of an acid having a $p_K$ value of 7–11 and selected from the group consisting of phenol, boric acid and arsenic trioxide is added to the absorbent.

4. Process of claim 1, wherein the absorbent entrained by the purified gas is removed in the scrubbing zone by scrubbing the gas with circulating water and/or diethylene glycol and is thereafter recovered from the rich scrubbing agent by distillation, the regenerated scrubbing agent being cooled and recirculated to the top of the scrubbing zone.

5. Process of claim 1, wherein the absorbent contains 5–20% by weight of water.

* * * * *